United States Patent
Baumann et al.

(10) Patent No.: US 7,834,478 B2
(45) Date of Patent: Nov. 16, 2010

(54) SINGLE- OR DUAL-INVERTER AUXILIARY POWER CONVERSION APPARATUS AND SYSTEM AND NARROW-HYSTERESIS CHARGING METHOD

(76) Inventors: Paul Baumann, 14234 S. Bell Rd., PMB 150, Homer Glen, IL (US) 60491; Bruce Wingen, 5130 Brighton Blvd., Denver, CO (US) 80216

( * ) Notice: Subject to any disclaimer, the term of this patent is extended or adjusted under 35 U.S.C. 154(b) by 284 days.

(21) Appl. No.: 12/148,007

(22) Filed: Apr. 15, 2008

(65) Prior Publication Data

US 2010/0026088 A9    Feb. 4, 2010

Related U.S. Application Data

(63) Continuation-in-part of application No. 11/999,581, filed on Dec. 5, 2007.

(60) Provisional application No. 60/923,871, filed on Apr. 16, 2007, provisional application No. 60/873,062, filed on Dec. 5, 2006.

(51) Int. Cl.
*B60L 1/00* (2006.01)
*B60L 3/00* (2006.01)
*H02G 3/00* (2006.01)

(52) U.S. Cl. .................................. 307/9.1; 307/10.1
(58) Field of Classification Search ................ 307/9.1, 307/10.1; 320/104
See application file for complete search history.

(56) References Cited

U.S. PATENT DOCUMENTS

2004/0199297 A1* 10/2004 Schaper et al. .............. 700/287
2006/0077603 A1*  4/2006 Kim .............................. 361/90

\* cited by examiner

*Primary Examiner*—Jared J Fureman
*Assistant Examiner*—Carlos Amaya
(74) *Attorney, Agent, or Firm*—Ater Wynne LLP

(57) ABSTRACT

A fuel-efficient auxiliary power generation, conversion, and supply system is configured within the periphery of a vehicular conveyance, and typically including a plurality of batteries, a power generator, an internal combustion engine, and an instrument control assembly including one or more inverter portions and a rectifier portion. A method for charging the batteries within a narrow hysteresis voltage range to reduce charging stress is described.

9 Claims, 5 Drawing Sheets

SINGLE- OR DUAL-INVERTER AUXILIARY POWER CONVERSION APPARATUS AND SYSTEM AND NARROW-HYSTERESIS CHARGING METHOD

RELATED APPLICATIONS

This application claims the benefit of priority to U.S. Provisional application No. 60/923,871, filed on 16 Apr. 2007 and entitled HYBRID AUXILIARY POWER CONVERSION APPARATUS AND SYSTEM, and is a continuation-in-part of and claims the benefit of priority from U.S. non-provisional patent application Ser. No. 11/999,581, entitled VEHICULAR OUTBOARD POWER CONVERSION APPARATUS, SYSTEM AND METHOD, filed Dec. 5, 2007, which claims benefit of priority to U.S. provisional application 60/873,062, entitled VEHICULAR OUTBOARD POWER CONVERSION APARATUS AND SYSTEM, filed 5 Dec. 2006, the contents of which, excepting only 60/873,062, are hereby incorporated herein in their entirety by this reference.

FIELD OF THE INVENTION

This invention relates generally to the field of vehicular power conversion. More particularly, it concerns improved efficiency in the provision of auxiliary power conversion systems for marine, recreational, commercial, air and/or military crafts or vehicles.

BACKGROUND OF THE INVENTION

American commercial truckers are required by recent federal regulation to pull off the highway and rest for ten hours out of every twenty-one hours on the road, e.g. eleven hours of driving must be followed by ten hours of rest. To date, truckers have pulled over and idled their truck engines during such stops, thereby to produce power sufficient to continuously or periodically operate air conditioning/heating and appliances such as refrigerators, televisions, computers, etc.

Internal combustion engines are extremely inefficient when idling. Children's asthma symptoms increase as a result of vehicle exhaust. The smallest pollutants from vehicle exhaust lodge deeply in the lungs causing lung damage, aggravating respiratory conditions such as asthma and bronchitis, increasing the risk of stroke and heart attack, leading to cancer and contributing to premature death. Vehicle exhaust is the leading source (~40-50%) of toxic air pollution in Oregon. Idling vehicles emit significant amounts of pollution, including sulfur dioxides, carbon monoxide, nitrogen oxide, and volatile particulate organic compounds leading to the formation of atmospheric carbon dioxide ($CO_2$). All known, peer-reviewed, published scientific studies agree that carbon dioxide by-products of human manufacture are a major contributor to global warming. An idling vehicle engine delivers zero miles to the gallon and thus wastes fuel, e.g. gasoline, diesel, bio-diesel or the like. Excessive idling is hard on a vehicle engine because the engine does not idle at peak operating temperature. Fuel does not undergo complete combustion, leaving spark plugs dirty, damaging cylinders and exhaust systems, and contaminating engine oil. Thus, such roadside idling to conform with the new federal safety regulations represents an inefficient and potentially damaging tax on a vehicle's engine, a waste of increasingly depleted fossil-fuel-based vehicle fuel resources worldwide, and an emission plume of air-borne toxins that harm the atmosphere and worsen an already existing global health hazard.

(A commercial trucker can drive only seventy hours in an eight day period, with a minimum of thirty-four hours of rest before restarting a fresh seventy hours. Accordingly, a typical driver idles approximately one hundred hours each week, and thus spends approximately four hundred hours per month idling. At approximately $3/gallon of diesel, this represents approximately $1200 dollars per month of wasted diesel, a precious fossil fuel commodity. The cost of running a conventional auxiliary power unit (APU) is approximately $400 dollars per month, at a cost savings (over idling the commercial truck's main internal combustion engine) of approximately $800 per month or $10,000 per year per commercial truck, based upon current fuel prices. The higher the price and scarcity of fuel, the more savings monthly, e.g. annually the trucker and/or company saves. Nevertheless, conventional APUs are relatively inefficient and costly to operate as an alternative to idling the main engine.)

Recreational vehicles (RVs), buses, houseboats, yachts, and other land or marine craft including military craft have auxiliary power needs similar to those of the commercial trucker for supplying power to such auxiliary systems as air conditioners/heaters and appliances such as refrigerators, computers, navigational or communication equipment, radios and the like. Many such appliances, e.g. televisions, require one or more relatively clean sources of alternating current (AC) power.

Refrigerated commercial trucks (so-called "refers") require an even more robust source of AC power. The power needs of such specially equipped trucks deeply tap the generator connected to the main drive system for the truck, i.e. its internal combustion engine. Conventional APUs do not supply sufficient power to meet such stringent refrigeration needs.

Accordingly, there is a need to provide clean and robust AC power to such auxiliary systems and appliances and at the same time to reduce the rate of consumption and pollution caused by roadside idling of land- and marine-based internal combustion engines.

DETAILED DESCRIPTION OF THE PREFERRED EMBODIMENTS

The invention in accordance with a preferred embodiment involves an auxiliary power system for a yacht or other watercraft, or for a vehicle such as a bus, RV, military vehicle such as a Bradley or Hummer, or commercial truck, all of which are referred to herein as "vehicles." Those of skill in the art will appreciate that auxiliary power in accordance with the present invention is outboard from the vehicle's main power train system. As such, the invention in accordance with one embodiment thereof taxes or burdens neither the main battery nor the main drive train (e.g. the internal combustion engine) of the vehicle.

Figure 1:
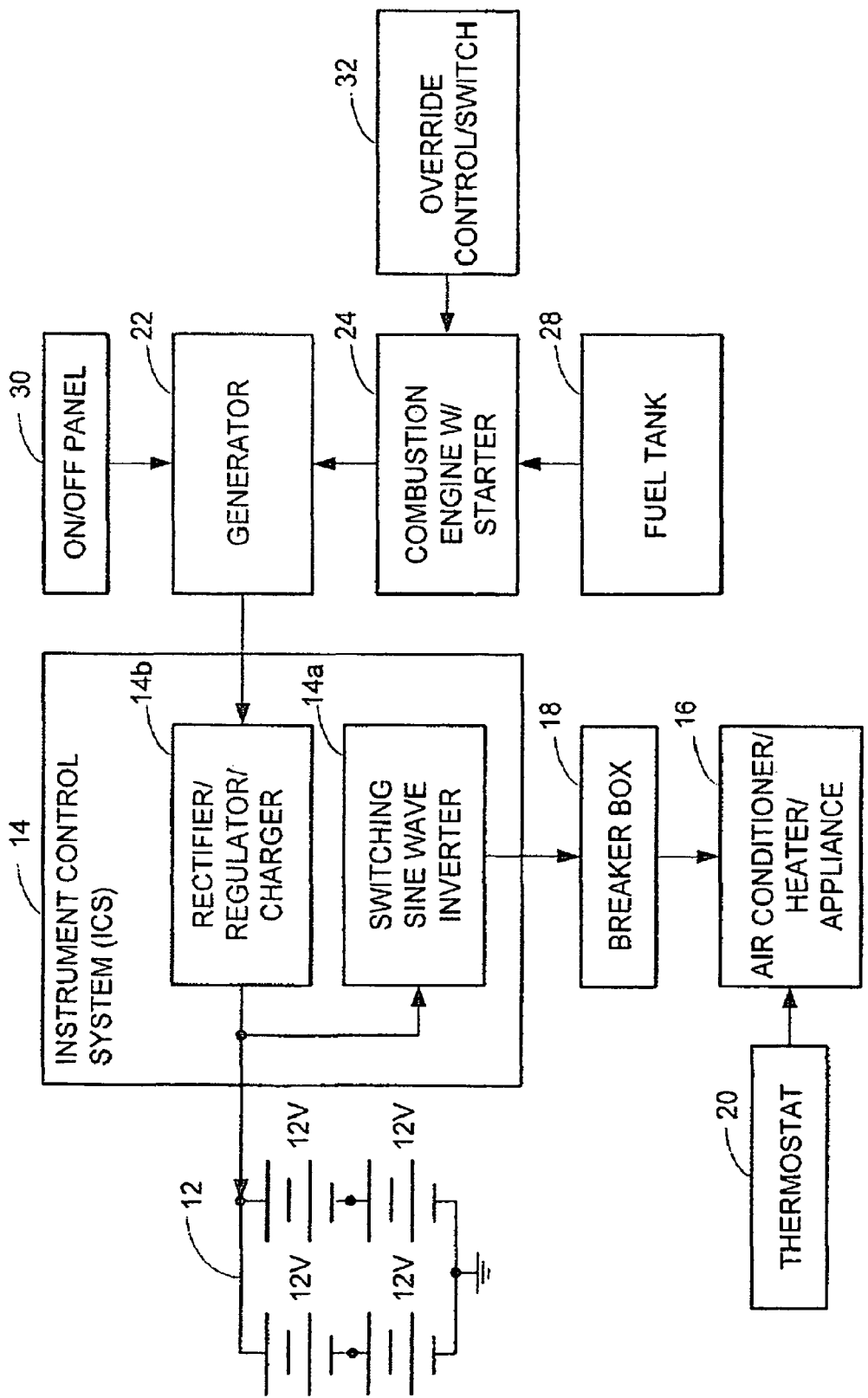
FIG. 1 is an electrical schematic block diagram of the hybrid auxiliary power conversion apparatus, in accordance with one embodiment of the invention that utilizes lead acid batteries and an instrument control system (ICS).
Figure 2:
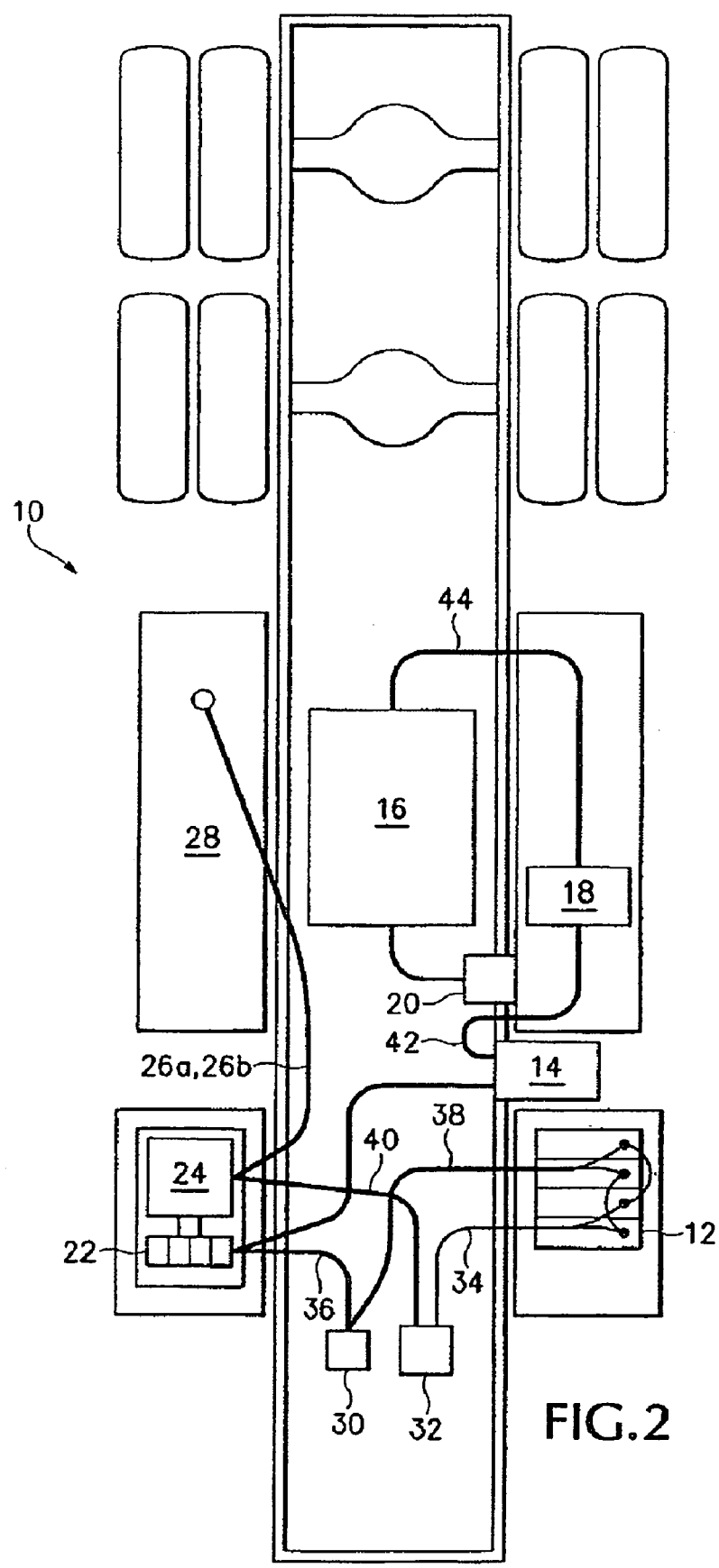
FIG. 2 is a top plan view of the invented apparatus and system in the context of its use in providing auxiliary power to a commercial wheeled vehicle, in accordance with one embodiment of the invention.

FIG. 1 illustrates the invented apparatus 10 by way of a schematic circuit diagram, in accordance with one embodiment of the invention utilizing a lead acid battery and instrument control system (ICS) and referred to herein as an eGen-a-Sys™ system. (eGen-a-Sys™, Gen-a-Sys™ and Gen-a-Sys Q™ are trademarks owned by Enertek Solutions, Inc., the assignee of the present invention, world-wide rights reserved.) FIG. 2 illustrates the invented apparatus 10 in a cutaway top plan view of a sleeper-type commercial truck, showing the chassis and tandem wheel assemblies schematically beneath the invented apparatus and system 10, for the sake of context. FIGS. 1 and 2 are referenced collectively immediately below.

Apparatus 10 is straightforward but unique to the present invention. It includes a bank 12 of lead acid batteries 12a, 12b, 12c, 12d, the bank of batteries being independent from the main battery system powering the vehicle. Batteries 12a, 12b, 12c, and 12d each are nominally 12 volts (direct current—VDC) automotive or marine batteries having a form factor compatible with a trim fit thereof within the left auxiliary equipment bay of, for example, a sleep-over type of commercial truck such as one made by Peterbilt™. Batteries 12a, 12b, 12c, and 12d available from Trojan™ are connected in series and parallel, as illustrated, to produce high-wattage 24VDC output to what will be referred to herein as an instrument control system (ISC) 14. (Any suitably alternative form factor and/or type of battery, e.g. lead acid, lithium ion, liquid metal hydride, etc., can be used.) ISC 14 inputs 24VDC input from lead acid battery bank 12 and produces an output of either 110 volts (alternating current—VAC) or 220VAC to drive an under-cab air conditioner/heater 16 (including conventional compression and/or refrigeration and/or heater components) such as one made by Carrier™ via a shore power breaker box 18. Those of skill in the art will appreciate that air conditioner 16 typically is regulated by a manual thermostat control 20 in the sleeper portion of the commercial truck or other vehicle. A five and one-half kilowatt (5.5 kW) generator 22 provides 400VAC to ICS 14, as indicated.

ISC 14 in accordance with the invention provides two primary functions: 1) it inverts 24VDC from bank 12 to 110VAC/220VAC, e.g. via high-efficiency switching components of a switching inverter 14a; and 2) it rectifies the 400VAC output of generator 22 to trickle charge the 24VDC battery bank 12, e.g. via a rectifier 14b. Those of skill in the art will appreciate that the functions of ISC 14 can be alternatively separated into functional or physical component parts, within the spirit and scope of the invention. Generator 22 is directly (shaft) driven in accordance with one embodiment of the invention by a seventeen horsepower (17 hp) internal combustion engine 24 supplied by gasoline, diesel, bio-diesel or any alternative fuel via one or more feed lines 26a, 26b from the vehicle's main or reserve fuel tank 28. (Those of skill will appreciate that a diesel engine typically must have a return because of the way a diesel injection system operates.) Such is designed to return excess unburned fuel in an approximately 10-50% proportion, depending upon the model. Moreover, in winter season or extremely cold environments, returned diesel heats the fuel in the main tank to prevent gelling.) A suitable diesel engine 24 (having an integral electronic starter, in accordance with one embodiment of the invention) is available from Lombardini™, although other internal combustion engines can be suitably substituted, within the spirit and scope of the invention.

Those of skill in the art will appreciate that the invented power conversion apparatus and system thus is a truly "hybrid" design in that it utilizes both a battery pack and an internal combustion engine to deliver pure AC power to vehicular appliances. It does so without drawing energy by way of a generator from the main vehicle drive system, e.g. the vehicle's own internal combustion engine. So it is also truly "outboard" in the sense that it is auxiliary to the main drive system.

ICS 14 and generator 22 having the above-described operating specifications are available from Aura Systems, Inc., although those of skill in the art will appreciate that they can be supplied by any suitable manufacturer and to any desired operating specifications, within the spirit and scope of the invention. (For example, suitable alternative, bidirectional, solid-state generators are available from SAWAFUJI™.) Those of skill in the art also will appreciate that, within the spirit and scope of the invention, generator 22 and engine 24 can be operatively coupled in any suitable manner, as by use of a clutch, belt or bearing operatively coupled therebetween. In accordance with one embodiment of the invention, the rotor shaft of generator 22 and the drive shaft of engine 24 are directly coupled to one another via a plastic 'slip' ring that delivers maximum torque and efficient mechanical-to-electrical power conversion, while protecting the engine and generator components from induced failure.

A dash-mounted generator on-off control panel 30 permits an operator (driver) of the vehicle to start and stop engine 24 as desired to provide auxiliary power to air conditioner/heater 16 or to other AC appliances (not shown) such as a refrigerator, a television, a computer, etc. A dash-mounted manual-override start/stop switch 32, for service and maintenance purposes, to govern the operation of apparatus 10 also is provided in accordance with one embodiment of the invention. For maintenance and/or trouble-shooting purposes, one or more monitoring or sense cables such as cable 34 are provided, in accordance with one embodiment of the invention, to enable maintenance personnel to monitor the DC level, charging capacity, and general 'health' of battery bank 12. Remaining cables and/or wiring harnesses 36, 38, 40, 42, and 44 route power respectively between generator 22 and control panel 30, between battery bank 12 and control panel 30 between engine 24 and override switch 32, between ICS 14 and breaker box 18, and between air conditioner/heater 16 and breaker box 18.

Those of skill in the art will appreciate that AC voltage drops are minimized in accordance with the invention by the simple expedient of shortening the wire harnesses that carry AC voltage from one component to another. More problematic DC voltage drops are minimized in accordance with the invention by using heavy gauge battery-cable wire, e.g. 00 ("double-ought"). Any suitable wiring harnesses for conducting AC or DC voltages within the invented apparatus and system are contemplated as being within the spirit and scope of the invention.

Figure 3:
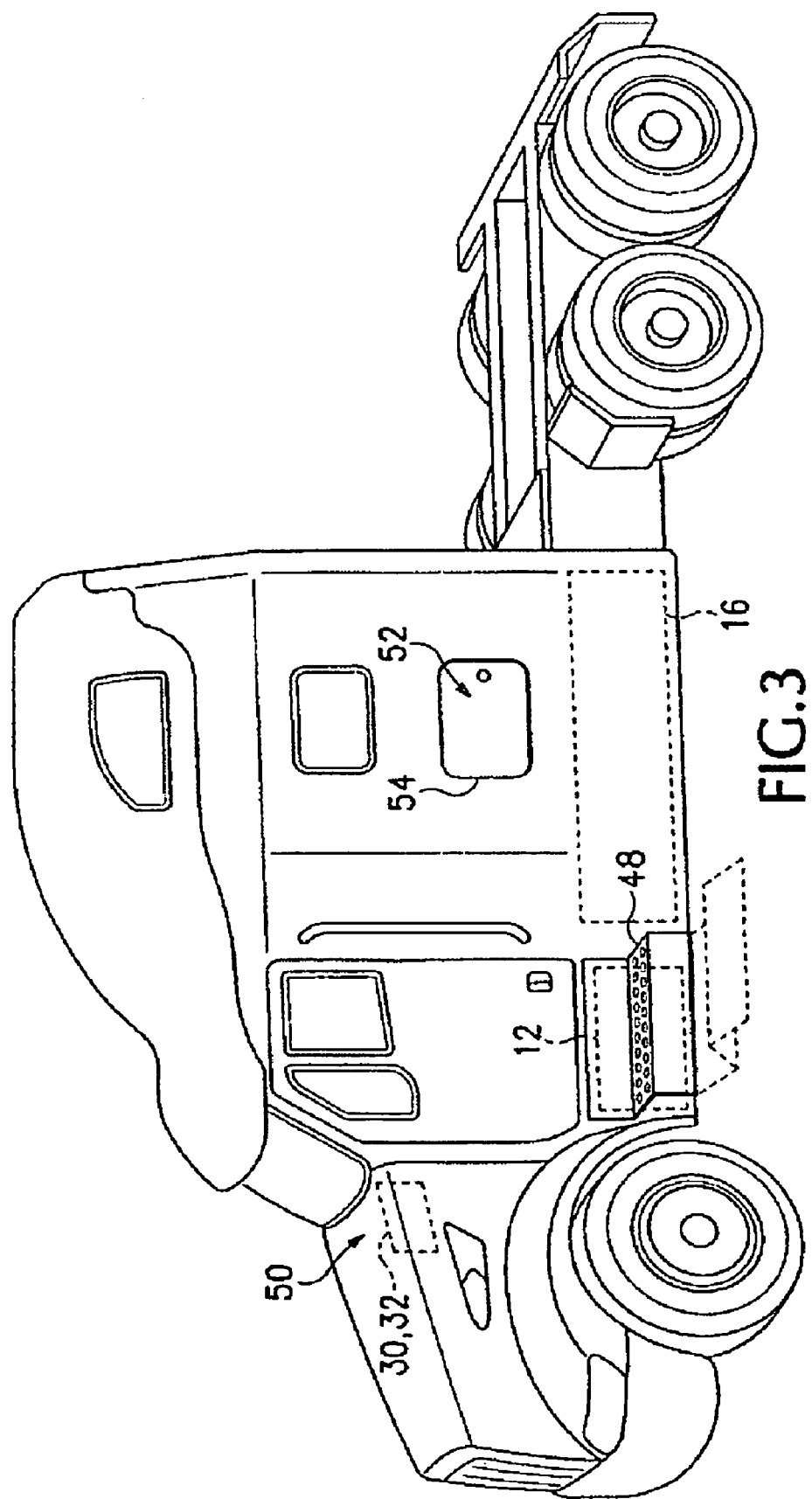
FIG. 3 is a left-side perspective of a commercial truck illustrating incorporation of the invented apparatus and system therein.
Figure 4:
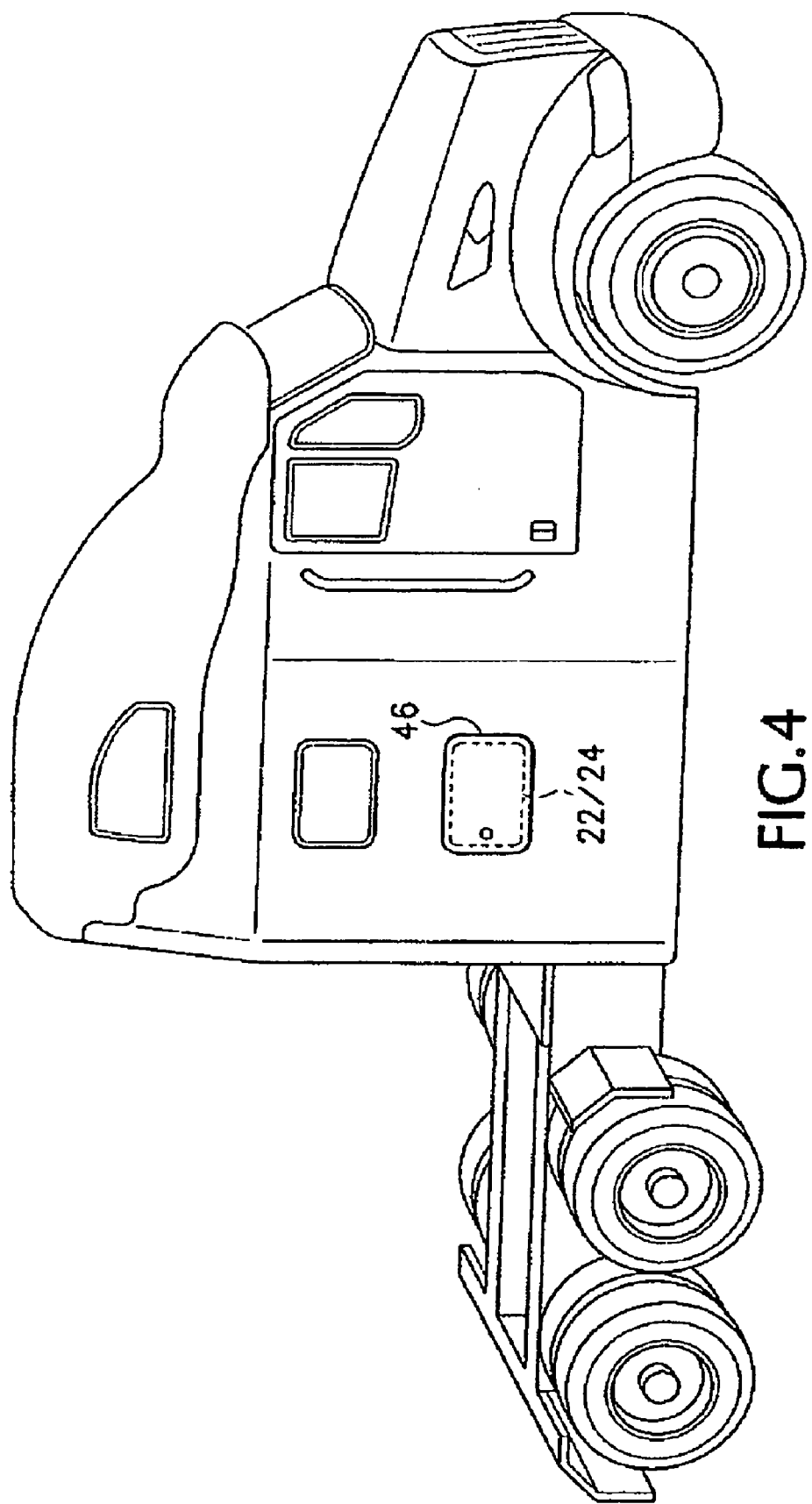
FIG. 4 is a right-side perspective corresponding with FIG. 3.

Referring collectively now to FIGS. 2, 3, and 4, the components of apparatus 10 in accordance with one embodiment of the invention are positioned strategically within the periphery of a stock sleeper truck so as to fit well and trim therein and so as not to interfere with normal operation thereof. For example, generator 22 and engine 24 fit within a smaller right-side auxiliary bay 46 (refer to FIG. 4) of the sleeper truck, bank 12 of batteries fits within a left auxiliary custom bay 48 behind a unique, hinged embodiment of the driver-side steps (refer to FIG. 3 showing the steps in dashed outline when pivoted away from the truck) of the sleeper truck, control panel 30 and switch 32 fit within a dash region 50 thereof, and air conditioner/heater 16 fits under a bed region 52 thereof between the dual parallel frame rails (not shown). Thus, all components are configured, dimensioned, and physically distributed, in accordance with the invention, to have only nominal impact on the normal operation and configuration of the vehicle. For example, the useful carrying and storage capacity of larger left-side cargo/equipment bay 54 (refer briefly to FIG. 3) is not adversely impacted by inclusion of apparatus 10 including air conditioner/heater 16, as is the case with conventional and less-well-designed retrofits.

The high functional density of the invented apparatus and system is evident from the thoughtful selection of the engine, generator, ICS, battery bank and air conditioner/heater components and their placement within and around the vehicle's auxiliary, custom and stock bays. For example, lead acid battery bank 12 fits within a right-rectangular custom bay or space under the driver's side step, the approximately eleven cubic feet (11 ft$^3$) space being approximately 32.5" in width, 22.5" in depth and 26" in height (with much room to spare, since the lead acid battery bank itself occupies only approximately 4.0 ft$^3$), while generator/engine 22/24 fit within a right-rectangular stock bay or space approximately 32.5" in width, 22.5" in depth and 12" in height. A standard Coleman air conditioner/heater unit is 12" in height, 26" in width, and 34" in length, which dimensions enable it to fit under approximately only one out of three Class 8 trucks.

A Low-Profile Carrier air conditioner/heater unit is of approximately the same dimensions, save for being only approximately 7½" in height. This enables the Low-Profile Carrier air conditioner/heater unit to be mounted under every Class 8 truck manufactured today, facilitating a veritable plug-n-play solution to the form and fit problem. In accordance with one embodiment of the invention, the normal storage capability (again, depending on truck model) which is standard on most trucks is approximately 6-8 ft$^3$. Departing radically from convention whereby the air conditioner/heater unit is placed under the bunk thus utilizing this limited storage space better used for clothes, food, luggage, extra tools, etc. the present invention places a Low-Profile Carrier air conditioner/heater unit under the truck cab, and thereby frees up the room inside the truck cab living space, thereby further increasing functional density. Thus, the four major, space-consuming components in accordance with one embodiment of the invention take up only approximately 15 ft$^3$ of volume, all of which surprisingly small volume is within the periphery of the vehicle but outside the large cargo bay.

In operation, engine 24 drives generator 22 at a nominal eighteen hundred revolutions per minute (1800 rpm) or suitable alternative that is compatible with an efficient tradeoff between fuel combustion and torque. Those of skill will appreciate that efficient operation of engine 24 depends upon its specific design specifications and operating efficiencies. Generator 22 supplies relatively dirty 400VAC to ICS 14 at a peak current consistent with its power rating, e.g. 5.5 kW. ICS 14 generates from the 24VDC battery bank 12 relatively clean 110VAC/220VAC and supplies the same to air conditioner/heater and other AC appliances (not shown) via breaker box 18. ICS 14 uses efficient, high-frequency switching components to generate a nearly pure sinusoidal 110/220VAC waveform substantially free of harmonic content. ICS 14 also rectifies and down-regulates the 400VAC from generator 22 into 24VDC and supplies the same to battery bank 12 to recharge the batteries when needed.

Thus, battery bank 12 is tapped continuously (while the auxiliary system is on) to generate the AC voltage demands of the auxiliary systems, while battery bank 12 is charged by the engine/generator 24/22 combination only periodically as needed to "top off" the batteries at full charge. This novel hybrid-power circuit topology and component configuration and arrangement makes far more efficient use of fuel from fuel tank 28, since operation of engine 24 and generator 22 is required only occasionally rather than continuously.

Indeed, conventional auxiliary power units (APUs) run continuously during a ten-hour roadside stop and rest period, consuming several gallons of fuel in a ten-hour rest period. In significant contrast, invented apparatus 10 runs only a couple of relatively brief, e.g. one to two-hour, periods of time over a ten-hour rest period, consuming only a couple of pints of fuel, nearly an order of magnitude improvement in efficiency based on run-time alone. Moreover, conventional APUs utilize engines that operate at higher rpm, e.g. typically 3600 rpm, which operation is less fuel efficient than the operation of engine 24 at 1800 rpm as in accordance with the invention. Thus, only approximately ⅓-½ the fuel is consumed in accordance with invented apparatus 10, and what fuel is consumed is consumed more efficiently to drive the high-efficiency generator and ICS. Again, this is due to the use of rectified AC power to charge the battery bank, the output of which is rectified and in turn used to power the auxiliary system, rather than, for example, driving the auxiliary system directly from an AC alternator or generator.

Thus, in accordance with the invention, by use of an engine operating at only approximately ⅓-½ the revolutions per minute and by use of such an engine only approximately ⅓-½ the time, it is possible to achieve up to a 9:1 efficiency advantage over conventional APUs, at great cost savings, great fossil fuel savings, and great reduction in toxic emissions. The invention succeeds by using a battery bank normally to power the auxiliary system, while only occasionally tapping the fuel source to replenish the at-voltage current-delivery capacity of the batteries.

An alternative embodiment of the invention is contemplated in which a Kubota™ diesel engine, a Markon™ generator, and a 3500 W inverter replace inverter 14a, rectifier 14b, generator 22, and engine 24 of FIG. 1. Thus, the Gen-a-Sys™ and Gen-a-Sys Q™ product configurations made in accordance with this alternative embodiment of the invention also represent an efficiency/performance improvement over conventional APUs, because of their similar but not identical circuit topology and componentry. Yet another embodiment envisioned as being within the spirit and scope of the invention not expressly illustrated in FIG. 1 whereby two inverters replace inverter 14a in a bifurcated power distribution mechanism: one characterized by a relatively low-power, low-cost "moderately" clean AC output for air conditioner/heater 16 and another characterized by a relatively high-power (e.g. 5.5 kW), but low-cost (e.g. $500) "purely" clean AC output for other appliances such as televisions or computers that are more sensitive to "dirty" power (containing digitally simulated sinewave "stairstep" harmonics or other artifacts). Such a "Virtual APU" would obviate the need for high-cost (e.g. $30 k) air conditioner/heater units such as Vector unit that puts out only 2 kW of relatively "clean" AC power.

Figure 5:
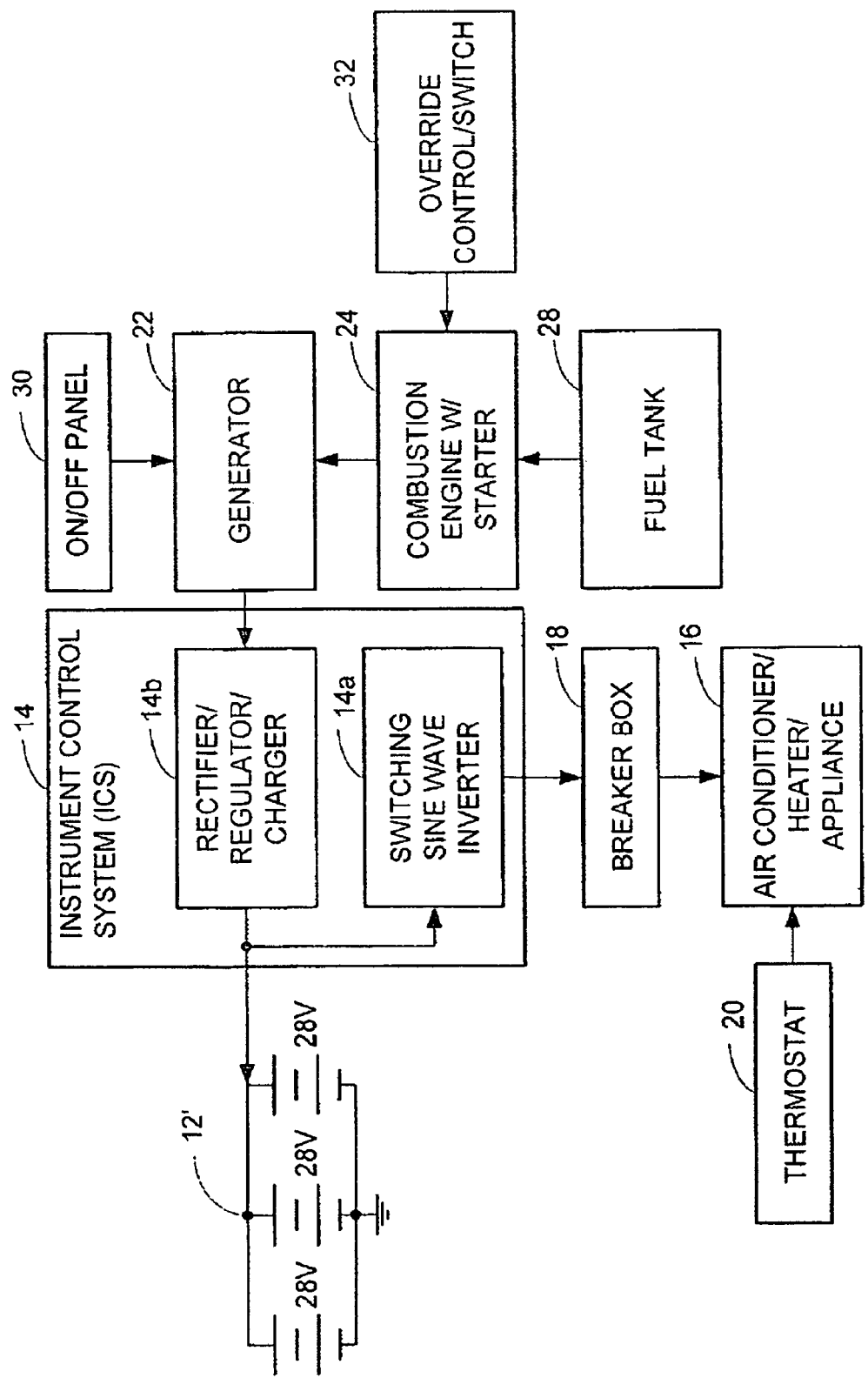
FIG. 5 is an electrical schematic block diagram of the hybrid auxiliary power conversion apparatus, in accordance with another embodiment of the invention that utilizes lithium (Li) ion batteries and a battery management subsystem.

FIG. 5 illustrates invented apparatus 10' in accordance with a second principal embodiment. It will be appreciated that identical components are represented by identical reference designators, and that similar components are represented by similar reference designators. For example, all components and their configuration within the illustrated circuit diagram are identical with those and that of FIG. 1, but for battery 12'.

Battery 12' will be understood to be an approximately 23" high vertically stacked arrangement of three 28VDC lithium (Li) ion battery banks connected in parallel. Each bank in turn includes in accordance with one embodiment of the invention seven stacked 4VDC cells connected in series. Each cell in accordance with one embodiment of the invention is an approximately rectangular shape approximately 12.5"×17.5"×0.8" and has elongate positive and negative terminals arranged side by side along a long side of the rectangle for easy parallel or series connection to an adjacent one of such cells (the parallel or series connection being determined by whether identical or opposite polarity terminals are in adjacent (left or right-side) placement within the stacked arrangement of cells and banks. Battery 12' nominally supplies up to three kilowatts (3 kW) of power for six continuous hours, after which battery 12' must be recharged for approximately two hours.

Those of skill in the art will appreciate that Li ion batteries 12' are lighter in weight, smaller in footprint, and smaller in volume than lead acid batteries 12 shown in FIG. 1. Indeed, the volume required to contain Li ion batteries 12' is less than approximately 3 $ft^3$ (as compared to the 4 $ft^3$ volume of battery 12), thus saving substantial space (compared to the space occupied by the lead acid batteries) within the right rectangular custom space behind the driver's side steps.

Li ion batteries 12' are charged with a relatively narrow-hysteresis loop charging cycle, in accordance with the invention. Conventional charging cycles are wider, alternately overtaxing or over-depleting the Li ion batteries, e.g. down to 16VDC, and then (over) charging them within a short period of time back up to their full nominal rated voltage, e.g. of 28VDC. The invented charging cycle enforced by ISC 14 instead permits the Li ion batteries to be depleted down to only approximately 21VDC before more gently charging them over a longer period of time back up to a de-rated voltage slightly below their nominal rated voltage, e.g. back up to only approximately 26VDC. This novel charging algorithm results in longer lives for the Li ion batteries and less stress and strain on the generator or regulator/rectifier/charger components of ISC 14. Accordingly, the previous experience of burning out generators is avoided.

Apparati 10 and 10' are referred to herein as being hybrid system topologies, since each features both a battery system and an internal combustion engine that runs on fuel, e.g. gasoline, diesel, bio-diesel or the like. Thus the invention may be thought of as involving hybrid auxiliary power units (APUs) for high-power, low-volume, lightweight, extended-use applications such as supplying auxiliary power to AC electronic devices and accessories in marine, recreational, commercial, air and/or military crafts or vehicles. They are auxiliary, as defined herein, because they advantageously do so without tapping the vehicles' main battery power reserve and without requiring the vehicles' main drive train to be operating.

Other suitable alternatives are contemplated as being within the spirit and scope of the invention. It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

From the foregoing, those of skill in the art will appreciate that several advantages of the present invention include the following.

The present invention provides greatly improved efficiency in providing AC power to auxiliary systems such as air conditioners/heater and or appliances such as refrigerators, televisions, computers, etc. It uses a surprising order of magnitude less fuel than conventional APUs, thus saving scarce natural resources, by barely 'sipping' fuel while providing DC charging power to a bank of durable batteries that, in turn, supply robust power to a high-efficiency switching inverter capable of supplying clean AC power to the auxiliary system. The invention takes the form of a compact, distributed-component system that maximizes the utility of the available space in a conventional sleeper-styled commercial truck. The relatively small footprint and volume, as well as the location, of the components beneath the bed and within the perimeter of the truck leave most cargo space empty and thus useful for its intended long-haul purpose. Moreover, the compact arrangement within the vehicle's periphery leaves the exterior of the vehicle free from external mounting hardware, hangers, supports, platforms, carriers, etc. The use of less fuel and the more efficient burning of smaller volumes of fuel solves two major problems at once: they conserve limited fossil fuel resources and they reduce toxic emissions and thus preserve the environment.

Those of skill in the art will appreciate that use of the invented apparatus and system is contemplated with any vehicle or marine craft, whether regulation requires a 'rest' period during which auxiliary systems need efficient outboard power. This is because the invention lends itself to highly efficient use of diesel or other fuel to supply AC power to any appliance, without requiring the vehicle or craft's main engine to be operating. Thus, incorporation of the invented system and apparatus or its equivalent within any vehicle or craft (e.g. commercial truck, RV, bus, marine, military or air craft, etc.) is deemed within the spirit and scope of the invention.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that embodiments of the methods and system of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A mobile hybrid-power generation and conversion apparatus for integration with a framework of an independently powered vehicular conveyance, the apparatus comprising:
   a power generation portion comprising an internal combustion engine-driven generator, the power generation portion configured to output an alternating current (AC) voltage;
   a power storage portion comprising one or more storage batteries providing a direct current (DC) voltage;
   a power conversion portion comprising an inverter portion and a rectifier portion, the power conversion portion configured operatively to couple the power generation portion with the power storage portion; and
   a control portion operatively coupled with each of the power generation portion and the power storage portion, the control portion including a battery power level monitoring means configured to detect a battery power level condition and automatically to initiate and terminate power generation to substantially maintain a collective battery power level within an operative range,
   the inverter portion being coupled with the power storage portion, the inverter portion including dual inverter circuits including a first digitally-simulated sinewave inverter circuit configured to convert the DC voltage from the power storage portion and to supply a relatively low-power AC voltage containing moderate sinewave harmonics to an air conditioner/heater characterized by lesser sensitivity to sinusoidal harmonics and a second digitally-synthesized sinewave inverter circuit configured to convert the DC voltage from the power storage portion and to supply relatively high-power AC voltage containing relatively less sinewave harmonics to one or more electrical appliances characterized by greater sensitivity to sinusoidal harmonics.

2. The apparatus of claim 1, wherein the power storage portion includes plural banks of plural batteries each.

3. The apparatus of claim 2, wherein the plural banks are connected to one another in parallel, and wherein each of the plural banks includes plural series-connected batteries therein.

4. The apparatus of claim 3, wherein each of the plural batteries are plate batteries stacked in overlapping adjacency to one another with positive and negative terminals thereof extending from alternate ends thereof.

5. The apparatus of claim 4, wherein the plural batteries are of a lithium ion or a liquid metal hydride type.

6. The apparatus of claim 5, wherein the power storage portion including the plural banks of plural batteries are configured to supply at least approximately three kilowatt-hours of power for at least approximately six hours of continuous use, and wherein the power storage portion including the plural banks of plural batteries are configured to fit within a volume of less than or equal to approximately three cubic feet.

7. The apparatus of claim 6, wherein the rectifier portion is coupled with the power storage portion and with the AC power generation portion and is configured to convey to the power storage portion a DC power output suitable to trickle charge one or more of the plural batteries thereof.

8. The apparatus of claim 7, wherein the power generation portion includes an auxiliary internal combustion engine operatively coupled with the generator, the auxiliary internal combustion engine being independently operable from a main internal combustion engine of the vehicular conveyance while sharing therewith only a common fuel tank.

9. The apparatus of claim 8, wherein the power storage portion including the internal combustion engine and the internal combustion engine-driven generator and the power generation portion including the inverter portion and the rectifier portion are sufficiently compact in size and arrangement collectively to fit within a volume less than or equal to approximately twenty cubic feet.

* * * * *